United States Patent [19]
Atkinson

[11] 3,812,267
[45] *May 21, 1974

[54] EXTRUDED PROTEINACEOUS MATERIALS

[75] Inventor: William T. Atkinson, Minneapolis, Minn.

[73] Assignee: Archer Daniel Midland Company, Minneapolis, Minn.

[ * ] Notice: The portion of the term of this patent subsequent to Jan. 6, 1987, has been disclaimed.

[22] Filed: Sept. 17, 1971

[21] Appl. No.: 181,602

Related U.S. Application Data

[63] Continuation of Ser. No. 787,244, Dec. 26, 1968, abandoned, which is a continuation-in-part of Ser. No. 587,939, Aug. 17, 1966, which is a continuation-in-part of Ser. No. 369,189, May 21, 1964, abandoned.

[52] U.S. Cl.............. 426/104, 426/137, 426/141, 426/364, 426/802
[51] Int. Cl......... A23j 3/00, A23l 1/20, A23l 1/325
[58] Field of Search.......... 99/14, 17; 426/104, 137, 426/141, 364

[56] References Cited
UNITED STATES PATENTS

| | | | |
|---|---|---|---|
| 3,142,571 | 7/1964 | McAnelly | 99/14 |
| 3,488,770 | 1/1970 | Alkmson | 99/17 |
| 3,102,031 | 8/1963 | MacAllister et al. | 99/14 |

OTHER PUBLICATIONS

Stansby, Maurice; Industrial Fish Technology, Reinhold Publishing Co., New York (1963), pp. 222–223 and 259.

*Primary Examiner*—A. Louis Monacell
*Assistant Examiner*—James Robert Hoffman
*Attorney, Agent, or Firm*—Plumley & Tyner

[57] ABSTRACT

Meat substitute food products comprising extruded protein materials containing a mixture of solvent-extracted oil seed material (e.g. soy protein) and fish protein concentrate.

3 Claims, No Drawings

EXTRUDED PROTEINACEOUS MATERIALS

This application is a continuation of my application, Ser. No. 787,244 filed Dec. 26, 1968, (now abandoned), which in turn is a continuation-in-part of my pending application, Ser. No. 587,939, filed Aug. 17, 1966, which in turn is a continuation-in-part application of Ser. No. 369,189 filed May 21, 1964 (now abandoned).

The present invention relates to the production of meat-like food products from vegetable, fish, and similar protein sources. More particularly, the present invention relates to the production of protein structures having a texture and appearance very similar to muscle protein found in common meat products such as steaks, fowl, chops, hams, and the like. The present invention further relates to a process for preparing meat-like protein products from solvent-extracted oil-seed proteinaceous materials and fish protein concentrate.

The preparation of meat-like food products from other more widely available or more economical protein sources has long been the aim of the food industry. A number of processes are now available by which meat-like products are obtained from vegetable protein sources. In general, these methods depend on extrusion techniques in order to prepare protein fibers which simulate the fibrous chewing quality of meats. A particularly important process is described in co-pending application, Ser. No. 587,939, filed Aug. 17, 1966, which is incorporated by reference herein. In the above-mentioned application, the process is described whereby a protein mix containing about 20–60 percent of water is masticated at a temperature above about 200°F and extruded through an orifice into a region of lower pressure. Upon contact with the lower pressure region, the water in the extrudate is caused to volatilize or steam resulting in a porous, fibrous product closely approximating the texture, appearance, and consistency of meat. Fish is a valuable and relatively inexpensive source of protein. It promises to become a more important and more economical source as methods for extraction become more widely known. Accordingly, it is important to develop methods by which fish proteins can be utilized in whole or part as the protein source in commercially acceptable products such as the above-described simulated meat products.

It is, therefore, an object of the present invention to provide a protein product of meat-like texture, appearance, and consistency.

It is a further object of this invention to produce such meat-like products from inexpensive proteinaceous raw materials.

A particularly important object of the present invention is to provide a protein product which simulates meat and in which at least part of the protein is derived from fish sources.

Still other objects of the present invention will be apparent from the following discussion.

The compositions of this invention comprise an extruded meat-like product comprising 75–99 weight percent of a solvent extracted, oil-seed proteinaceous material and 1–25 weight percent of a fish protein concentrate.

The protein product of the present invention is obtained by the extrusion of moistened mixture of solvent-extracted oil-seed proteinaceous material and fish-protein concentrate in the form of a plastic mass at a temperature above 200°F through an orifice into a medium of lower pressure to result in a porous, protein-containing product of plexilamellar structure. The product can also be characterized by its open-cell structure in which a majority of cells have a length-to-width ratio of greater than 1, the length being measured in the direction of extrusion and the width being measured in the transverse direction.

The extrusion of the number of widely available protein materials has been attempted in the above-described process. Obviously, fish proteins, because of their availability and ever-decreasing costs, are likely candidates for the preparation of simulated meat products by the above process. It was found that the extrusion of commercially available fish meals did not give rise to extruded products of the same quality as obtained with solvent extracted oil seed proteinaceous materials. It is theorized that this was due to the fact that fish meals contain a relatively high residual oil content (e.g. 5.0–10.0 percent) and because fish proteins are highly denatured.

It was found, however, that mixtures containing up to about 25 percent by weight of fish protein concentrate which has a protein concentration of about 75 to 80 percent and contains less than 0.5 percent fat and solvent extracted oil-seed proteinaceous materials as the remainder of the protein containing component of the extrusion mix could be extruded by the above process to give rise to a product having an expanded cellular structure and on rehydration the texture and chewiness of cooked lean meat.

The process of this invention is not limited to any particular solvent-extracted oil-seed material. The materials intended to be included are edible materials having a protein content of at least 30 percent by weight. The preferred solvent extracted oil-seed materials are obtained from oil-seeds such as peanuts, cottonseeds, sesame seeds, or soy beans. Solvent extraction of oil-seeds to remove oil and other fatty materials is well known in the art, and, thus, need not be specifically described. The oil-seed meals which have protein concentrations of 40–70 percent are preferred since they can be extruded into the plexilamellar product of the present invention over a broad range of conditions. Finely divided protein flour is less preferred because of its high lubricity and its less tendency to shear and orientate. The protein concentration of the protein material to be extruded should, however, be maintained at a level above 30 percent since otherwise other materials present will interfere with the formation of the continuous protein phase and its orientation in the masticating step. It is particularly important that the protein concentration of the protein material be maintained at levels above 30 percent when substantial proportions of fish protein concentrate are utilized since the process appears to be more sensitive when higher proportions of fish protein concentrate are used. Although fillers such as farinaceous materials can be added to the extrusion mix and a cellular product obtained thereby, the addition of any significant amounts of farinaceous additives, i.e. above 5 to 10 percent, adversely affects the rehydratability of the extruded product, particularly at elevated temperatures. It is, therefore, preferred to employ extrusion mixes which contain little or no added farinaceous fillers.

The process employed to form the meat-like products of this invention containing fish protein more specifically comprises admixing the protein-containing raw material with water to form a protein mix; masticating the protein mix at a temperature above 200°F under sufficient pressure to maintain the water in the protein mix and to cause the formation of a plastic mass; causing unidirectional flow of such plastic mass; then extruding the plastic mass through one or more flow restricting orifices into a medium of lower pressure and temperature in which the water will be released as steam.

The term "plastic mass" as employed herein is meant to define a deformable, flowable material in which the protein is the continuous phase and in which the original particulate protein employed as the starting material can no longer be determined by visual microscopic examination. It is theorized that most protein-bearing materials contain the protein in encapsulated form and that the protein therefore does not constitute the continuous phase. The shearing action in the masticating or plasticizing step of the present invention causes the cellular protein structure to be ruptured and the protein to be released as the continuous phase. In addition, the protein-water mixture in the process of being sheared is also subjected to unidirectional flow during the formation of the plastic mass. This is believed to cause orientation or alignment of the protein macromolecules and is believed to be, at least in part, responsible for the structure, hydratability, and chewability of the plexilamellar protein. Although a wide variety of equipment can be employed to accomplish the aforesaid process steps, it will be apparent that extruders of the type employed in the fabrication of thermoplastic resins are eminently suited to the process of the present invention. These extruders, comprising a heated barrel, a rotating screw within the barrel, and an extrusion die at the front end of the barrel, provide the necessary masticating action at the desired pressure and temperature to cause the formation of the plastic mass. The rotating screw builds up to the pressure required to cause the mass to flow unidirectionally and to push the plastic mass through the restricted orifice in the extrusion die, giving rise to the pressure differential across the die orifice required to cause the formation of the plexilamellar extrudate. The barrel in combination with the rotating screw create, in effect, a closed chamber which prevents the release of the steam from the protein mix until it emerges from the die. As a result of the pressure differential across the die orifice, the steam is released and causes the expansion of the protein extrudate.

Although the following explanation of the unique properties of the plexilamellar protein is not to be considered as binding, it is given for a better understanding of the novel product of the present invention. Thus, it is believed that the tough, resilient structure of plexilamellar protein which allows it to be cooked for long periods of time without disintegration into mush is the result of a two-fold orientation occurring in the extrusion. Thus, molecular orientation is induced when the protein mix is transformed into a plastic mass during mastication and when the resulting plastic mass is pushed through the orifice under pressure. Since the expansion of the extrudate on emergence from the die is not limited to the direction of flow, it will be apparent that the resulting extrudate may contain some multiaxial orientation and this may add to the cause of the unique properties of plexilamellar protein.

The nature of the extrudate, for any given starting material, is principally governed by the concentration of water in the protein mix, the temperature to which the protein mix is heated during the extrusion, and the pressure developed in the extruder. The presence of water is essential for two reasons: it plasticizes the protein mix to form the necessary plastic mass, and it causes the expansion of the extrudate. It, therefore, follows that an increase in the concentration of water will result in greater plasticization and a higher degree of expansion. However, as is well-known, proteins contain water which is not released at the temperatures employed for extrusion and thus is available for plasticization. The concentration of such nonreleasable water is not constant and increases with decreasing extrusion temperatures as well as with increasing protein concentrations in the protein mix fed to the extruder. It will also vary with the nature of the proteinaceous material employed. Hence, the minimum concentration of water necessary to obtain the formation of the plexilamellar extrudate will vary, but should be at least 10 to 15 percent above the nonreleasable water concentration. If the water concentration becomes too high, the fluidity of the protein mix is too high to allow the necessary shearing action during the masticating step. The resulting expansion may also cause a greater than desired cell structure. In general, the total concentration of water should be within the range of 20 to 60 percent by weight of the protein mix.

Since the expansion of the extrudate normally occurs at atmospheric pressure, the minimum temperature to which the protein mix must be heated is the boiling point of water, 212°F, in order to cause steam expansion of the extrudate. The application of a vacuum to the extrudate may, of course, allow the use of somewhat lower temperatures such as 200°F. Temperatures of at least 200°F are furthermore necessary in the mastication of the protein mix to form the desired plastic mass. The necessity of such temperature is not clearly understood, although it is believed that structural changes occur in the protein which allows it to assume a plastic flow.

An increase in the extrusion temperature, i.e. temperature of the protein mix during extrusion, other variables being maintained constant, will result in a more delicate funicular structure. The absolute upper limit of the extrusion temperature is dictated by the stability of the protein mix, and extrusion temperatures should not be so high as to cause substantial degradation of the protein or any additive being present. Since the physical structure of the product is affected by extrusion temperatures, the preferred temperatures are those which give rise to the desired structure. This is readily established experimentally. In general, the extrusion temperature is maintained within a range of 200 to 450°F and preferably within a range of 240 to 350°F. The extrusion temperatures referred to are applicable to the plasticizing zone in the extruder and the die orifice.

The formation of the plastic mass from the protein mix and its extrusion into plexilamellar protein requires sufficient pressure to maintain the plasticizer, i.e. the water, dispersed in the protein mix and also sufficient pressure to shear the protein particles and cause the protein to become the continuous phase. The pressure is also employed to cause the unidirectional flow of the plastic mass, i.e. flow through the helical path formed by the extruder screw and barrel, in the plasticizing section of the extruder and out of the extruder orifice. For most protein mixes employed in the extrusion of plexilamellar protein, the minimal pressure conditions stated will also result in the required unidirectional flow necessary for the structure of the plexilamellar protein of the present invention. In the rare instance where such pressure is insufficient to give rise to the oriented structure characteristic of plexilamellar protein, the extrusion pressure is increased until the necessary orientation is obtained. This can be accomplished by various means such as increasing the screw speed, decreasing the size of the orifice, increasing the compression ratio of the screw.

The fact that orientation of the extrudate is obtained at the conditions outlined is not intended to indicate that the extrusion is limited to such pressures. Higher pressures can be employed to increase the extrusion rate. Upper limits of pressure are generally dictated by the particular extrusion equipment employed. However, too high pressures result in a discontinuous extrudate caused by excessive shearing which is generally not desirable. The design of the extrusion orifice is a matter of choice and may vary from a slit or band orifice to a circular or square orifice. It should only be remembered that the extrusion orifice is a matter of choice and may vary from a slit or band orifice to a circular or square orifice. It should only be remembered that the extrusion orifice should not be so large that the extrusion equipment cannot produce the necessary pressure to cause the formation of plexilamellar protein. In general, the extrusion pressure as measured by the pressure drop across the orifice should be at least 100 psi and preferably in the range of about 250 to about 900 psi.

Various additives can be blended into the protein mix to improve its extrusion characteristics or to alter the nature of the hydrated extrudate with respect to texture, firmness, and cohesion. Thus, in general, the pH of the protein mix is adjusted to be within a range of 5.0 to 8.5 and preferably within a range of 6.5 to 7.5. At pH levels below 5.5, the extrusion becomes difficult in standard extrusion equipment in view of the reduced flow of the protein mix when transformed into a plastic mass. The hydrated extrudate furthermore may be too rubbery from the standpoint of chewing and too sour from the standpoint of taste. Increasing the pH from this low level results in increased tenderness. A pH level above 8.5 may result in a bitter taste, making the product unsuitable for consumption.

Sodium chloride can also be used as an additive. It is generally employed in concentrations of up to 3 percent based on the protein mix. The addition of sodium chloride also increases the firmness of the hydrated product and thus sodium chloride may be used to complement the effect of pH. However, additiion of too much sodium chloride can result in poor extrusion.

A third valuable additive is a soluble calcium salt such as calcium chloride. Calcium ions act as crosslinking agents which bridge the protein intermolecularly as well as intramolecularly. This bridging is particularly desirable when the concentration of the protein-containing material of the composition to be extruded drops below 50 percent. The bridging improves the shearing action occurring during extrusion and expansion. Increased shear will result in a more fibrillated plexilamellar structure, resulting in a finer texture of hydration, and also will give rise to a higher degree of firmness and chewiness. In general, the concentration of the calcium salt should not exceed 3 percent of the protein mix.

It will be appreciated that various other flavoring and coloring additives normally added to meat-like protein products can also be added to the protein mix of the present invention prior to extrusion.

The plexilamellar extrudate emerges from the extruder as one or more continuous bands or strands. It is, in general, desirable to cut the extrudate into pellets or chunks for easier packaging, handling, or storing. Depending on the extrusion conditions employed, a substantially dry or slightly moist extrudate (e.g. having a total moisture content of about 15–30 percent) is obtained. From a standpoint of storage and transportability, it is desirable to dry the moist extrudate prior to packaging. In the dried state, the plexilamellar structure of the extrudate is compacted but not eliminated. The density of the dry product can range from 0.25 to 1.50 grams per cubic centimeter; more often, the density will be from 0.5 to 1.3 grams per cubic centimeter. The hydration of the plexilamellar extrudate is readily achieved by contact with water, preferably at elevated temperatures. Thus, the dried extrudate may be simmered or pressure-cooked in water, and readily swells and expands to result in a texture similar to that of cooked meat. The texture of the hydrated extrudate can be varied to assume the structures of known cooked meat products by changing the extrusion conditions, particularly extrusion temperatures, the pH of the protein mix, and the nature and amount of additives such as the sodium and calcium salts. Higher extrusion temperatures, lower pH, and addition of calcium chloride can change the texture of the hydrated product from that of cooked chicken meat to that of cooked beef.

The plexilamellar extrudate of the present invention is characterized by its ability to be rapidly and uniformly hydrated and its ability to absorb sufficient water to give it the chewiness and texture of cooked lean meat. The chewiness and texture of a coherent protein product is in part affected by its water content. It is, therefore, highly important that in preparing the protein product for consumption it contains enough water to reflect the chewiness of lean meat. A protein product containing too much water normally is too soft and mushy to resemble meat, whereas a protein product not containing enough water is normally too hard and either brittle or tough, depending on its preparative history. In preparing a cooked product from a dry or slightly moist protein product such as is produced in the present invention, it is necessary to hydrate the product. It is advantageous for the protein product to absorb a large quantity of water or other liquid absorbed adds directly to the weight of the hydrated product. The plexilamellar product of this invention retains its tough, meat-like texture even when it absorbs an amount of water equal to many times its own weight. The extent of water absorption is illustrated as the hydration ratio, by which is meant the weight ratio of the hydrated product to the product prior to hydration obtained by immersing a sample of the product in boiling water for 15 minutes. The plexilamellar protein products of the present invention have hydration ratios ranging from 2.0 to 8.5 and preferably in the range of 2.5 to 6.0. Ordinarily, the hydration ratio will be from 2.5 to 3.5. In this range, the hydrated product exhibits the chewiness of cooked lean meat.

It is likewise important that the protein product of this invention exhibit sufficient toughness to provide the mouth feel and chewiness of meat. An appropriate means of measuring this property is by determining the shear strength, i.e., the maximum stress the material can develop under the shearing forces. It is clear that chewing subjects the product to shear and the stress of the product determines, in large part, its similarity to meat. Of course, different types of meat have different resistances to shear; for example, steak can withstand a much greater shear than can hamburger or sausage. In this invention, the shear which the hydrated products can withstand ranges from 100 to 1,500 pounds, more usually from 200 to 1,000 pounds. Ordinarily, the shear force will be from 400 to 600 pounds.

The invention is further illustrated by the following examples in which all parts are by weight unless otherwise indicated. These examples illustrate the preparation of like food products containing fish protein concentrates prepared in accordance with this invention.

EXAMPLES 1-4

The components listed in Table I below were mixed in a ribbon blender at 120°F for about 20 minutes:

TABLE I

| INGREDIENT | EXAMPLE | | | |
|---|---|---|---|---|
| | 1 | 2 | 3 | 4 |
| Solvent extracted soy bean flakes | 95 | 90 | 80 | 75 |
| Fish protein concentrate (Viobin) | 5 | 10 | 20 | 25 |
| Water for extrusion | 40 | 40 | 40 | 40 |

Each of the resulting compositions were extruded in a "Prodex" 1¾ inch extruder equipped with a medium compression screw and an extrusion die containing eight 3/16 inch diameter orifices. The extruder was maintained at a temperature of 350°F at the extrusion die and the front end of the barrel. The screw was rotated at the rate of 146 r.p.m.

The products expanded rapidly on emerging from the die while releasing steam. Substantially dry plexilamellar protein strands were obtained which were cut into 0.5 inch lengths by a rotating knife. The resulting products were autoclaved at 15 psi steam for 60 minutes. The hydrated products had meat-like textures and had firm and chewy eating characteristics. Products 3 and 4 were adjudged to be somewhat dry and tough.

From the foregoing description of specific embodiments of the present invention, numerous modifications and alterations will be apparent to those skilled in the art, and it is intended that such be included with the scope of the present invention.

Although the invention has been described in considerable detail with reference to certain preferred embodiments thereof, it will be understood that variations and modifications can be effected within the spirit and scope of the invention as described above and as defined in the appended claims.

What is claimed is:

1. An expanded food product comprising 75–99 percent by weight of solvent-extracted oil-seed proteinaceous material having a protein concentration of at least 30 percent and 1–25 percent by weight of fish protein concentrate and having an open-cell structure, in which the majority of the cells have cell dimensions of greater length than average width, the length of said cells being substantially aligned.

2. An expanded food product consisting essentially of 75–99 percent by weight of solvent-extracted oil-seed proteinaceous material having protein concentrations of at least 30 percent, and 1–25 percent by weight of fish protein concentrate and having an open-cell structure in which the majority of the cells have cell dimensions of greater length than average width, the length of said cells being substantially aligned, and a hydration ratio in the range of 2.0 to 8.5.

3. The expanded food product of claim 1 wherein the oil-seed proteinaceous material is a solvent-extracted soy bean material.

* * * * *